United States Patent
Gupta

(10) Patent No.: US 11,451,745 B2
(45) Date of Patent: Sep. 20, 2022

(54) CONFERENCE DEVICE WITH MULTI-VIDEOSTREAM CONTROL

(71) Applicant: GN Audio A/S, Ballerup (DK)

(72) Inventor: Yashket Gupta, San Jose, CA (US)

(73) Assignee: GN Audio A/S

( * ) Notice: Subject to any disclaimer, the term of this patent is extended or adjusted under 35 U.S.C. 154(b) by 0 days.

(21) Appl. No.: 17/184,239

(22) Filed: Feb. 24, 2021

(65) Prior Publication Data

US 2022/0272300 A1 Aug. 25, 2022

(51) Int. Cl.
  *H04N 7/15* (2006.01)
  *H04N 5/232* (2006.01)
  *H04N 5/265* (2006.01)
  *H04N 5/268* (2006.01)
  *H04N 5/225* (2006.01)

(52) U.S. Cl.
  CPC ............. *H04N 7/15* (2013.01); *H04N 5/2258* (2013.01); *H04N 5/23229* (2013.01); *H04N 5/265* (2013.01); *H04N 5/268* (2013.01)

(58) Field of Classification Search
  CPC .......... H04N 7/15; H04N 5/232; H04N 5/225; H04N 5/268; H04N 5/265
  USPC ............................................ 348/14.01–14.16
  See application file for complete search history.

(56) References Cited

U.S. PATENT DOCUMENTS

| | | | |
|---|---|---|---|
| 2004/0263636 A1 | 12/2004 | Cutler et al. | |
| 2006/0215752 A1* | 9/2006 | Lee | H04N 21/4728 375/240.08 |
| 2010/0289904 A1* | 11/2010 | Zhang | H04N 7/148 348/207.1 |
| 2012/0314015 A1 | 12/2012 | Watson et al. | |
| 2016/0112674 A1* | 4/2016 | Li | H04N 19/115 375/240.13 |
| 2018/0013980 A1* | 1/2018 | Oyman | H04N 21/4728 |
| 2020/0382709 A1 | 12/2020 | Sharma et al. | |

OTHER PUBLICATIONS

Mai Zheng et al., Stitching Video from Webcams, Dept of Electronics Science and Technology, Univ of Science and Technology of China Dec. 1, 2008.
Extended European Search Report dated Jul. 20, 2022 application No. 22158434.5-1208.

\* cited by examiner

*Primary Examiner* — Melur Ramakrishnaiah
(74) *Attorney, Agent, or Firm* — HM Law Group LLP; Vani Moodley, Esq

(57) ABSTRACT

A conference device comprising a first image sensor for provision of first image data, a first image processor configured for provision of a first primary videostream and a first secondary videostream based on the first image data, an intermediate image processor in communication with the first image processor and configured for provision of a field-of-view videostream and a region-of-interest videostream, wherein the field-of-view videostream is based on the first primary videostream, and the region-of-interest videostream is based on the first secondary videostream, and an output processor configured to determine first image control data based on the field-of-view videostream and transmit the first image control data to the first image processor, wherein the first image processor is configured for provision of the first secondary videostream based on the first image control data.

15 Claims, 3 Drawing Sheets

CONFERENCE DEVICE WITH MULTI-VIDEOSTREAM CONTROL

The present disclosure relates to a conference device and related methods for multi-videostream control.

BACKGROUND

In videoconferencing, it can be advantageous to have multiple videostreams, such as dual or trial, occurring at the same time. However, there are difficulties in achieving high resolution and/or high quality for all of the videostreams, thereby limiting the scalability of the videostreaming.

SUMMARY

Accordingly, there is a need for improved conference devices, e.g. conferencing systems, solutions, assemblies, methods, that can be scalable for multi-videostream capabilities.

Disclosed herein are one or more exemplary conference devices. The conference device can include a first image sensor. The first image sensor can be for provision of first image data. The conference device can include a second image sensor. The second image sensor can be for provision of second image data. The conference device can include a first image processor. The first image processor can be configured for provision of a first primary videostream and a first secondary videostream based on the first image data. The conference device can include a second image processor. The second image processor can be configured for provision of a second primary videostream and a second secondary videostream based on the second image data. The conference device can include an intermediate image processor. The intermediate image processor can be in communication with the first image processor and the second image processor. The intermediate image processor can be configured for provision of a field-of-view videostream. The intermediate image processor can be configured for provision of a region-of-interest videostream. The field-of-view videostream can be based on the first primary videostream and the second primary videostream. The region-of-interest videostream can be based on one or more of the first secondary videostream and the second secondary videostream.

Disclosed herein are one or more exemplary conference devices. The conference device can include a first image sensor. The first image sensor can be for provision of first image data. The conference device can include a first image processor. The first image processor can be configured for provision of a first primary videostream and a first secondary videostream based on the first image data. The conference device can include an intermediate image processor. The intermediate image processor can be in communication with the first image processor. The intermediate image processor can be configured for provision of a field-of-view videostream. The intermediate image processor can be configured for provision of a region-of-interest videostream. The field-of-view videostream can be based on the first primary videostream. The region-of-interest videostream can be based on the first secondary videostream. The conference device can include an output processor. The output processor can be configured to determine first image control data. The first image control data can be based on the field-of-view videostream. The output processor can be configured to transmit the first image control data to the first image processor. The first image processor can be configured for provision of the first secondary videostream based on the first image control data.

The present disclosure provides for devices, such as conference devices, and methods for achieving multi-videostream capability, as well as control of the multi-videostreams. In particular, the conference devices can utilize parallel video streaming.

Specifically, the present disclosure allows for a field-of-view videostream to be provided to a user along with a region-of-interest videostream. The region-of-interest videostream may vary as different regions of the original image data become the focus. The focus of the region-of-interest videostream can be controlled by user inputs or via a machine learning engine. Further, the present disclosure can utilize a field-of-view videostream to determine control data for affecting the region-of-interest videostream.

Advantageously, the present disclosure can allow for a modular, plug-and-play system or conference device for achieving the multi-videostreams. Therefore, instead of a complicated setup, a user can, for example, plug into a single connector to achieve the multi-videostreams, thereby greatly simplifying the user requirements for operating the conference device.

Moreover, the conference devices and methods can be scalable for high quality videostreams. As the field-of-view videostream and the region-of-interest videostream are tied to the original image data from the image sensor, the conference device does not have to heavily process high quality videos throughout. Accordingly, both the field-of-view videostream and the region-of-interest videostream can have high quality, thereby improving user experience and viewing options and reducing costs and time. Thus, the disclosure is capable of taking advantage of the original image data without any loss of quality when providing multi-videostreams to user or host device.

It is an important advantage of the present disclosure that separate and independent field-of view and region-of-interest videostreams are provided to allow for flexible and high-quality viewing options.

Additionally, the present disclosure allows for real-time adjustment of the region-of-interest videostream based on the field-of-view videostream, while maintaining a high image quality for the region-of-interest video stream.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1:
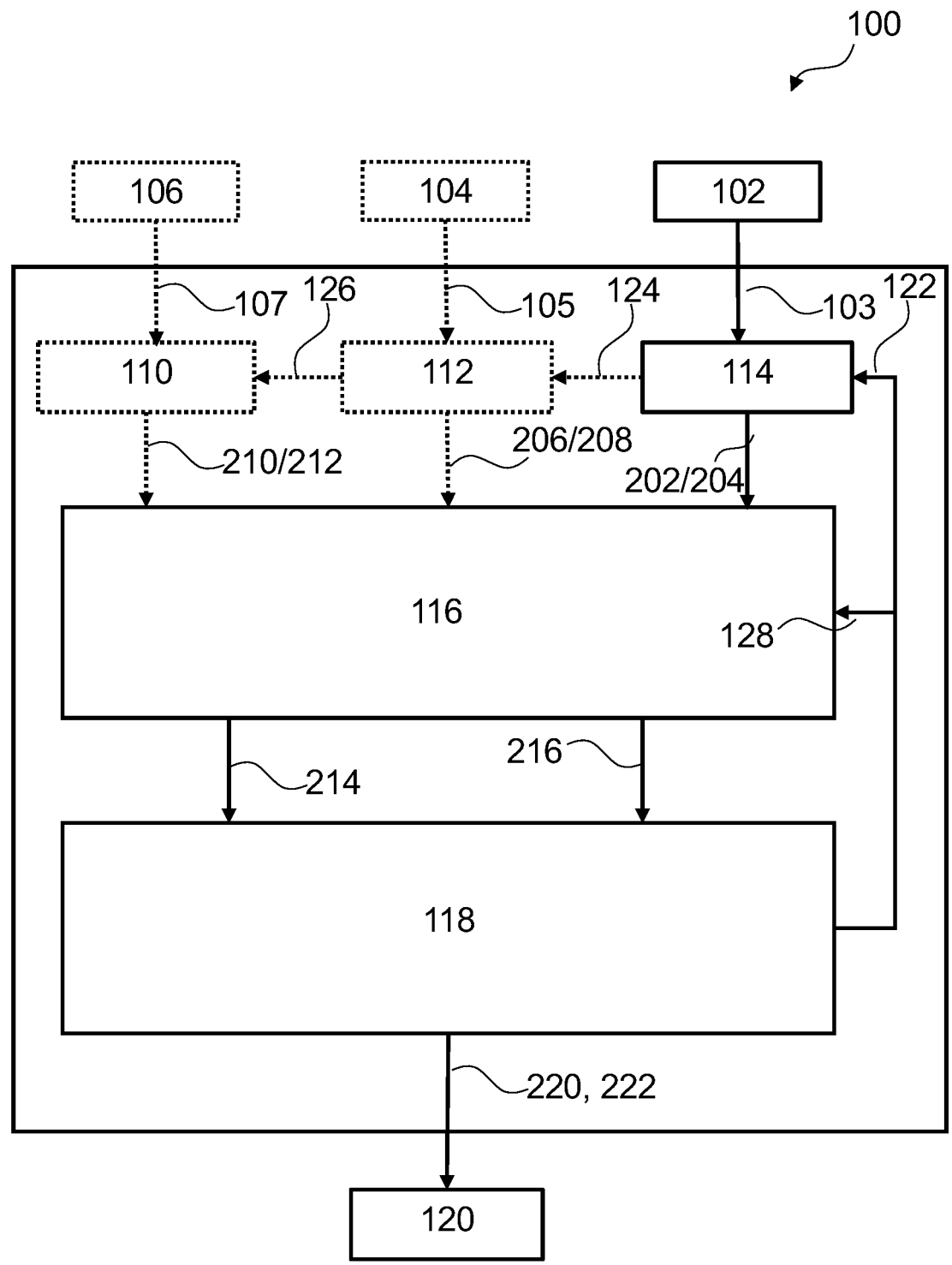
FIG. 1 illustrates an exemplary conference device of the disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Disclosed herein are conference devices, e.g. conferencing devices, conferencing systems, solutions, assemblies, that have multi-videostream capabilities, e.g. multiple videostream capabilities. Further disclosed herein are methods for achieving multi-videostream capabilities for conferencing devices. For example, the conference device can provide for a dual videostream. The conference device can provide for live and/or real-time videostreams.

In one or more exemplary conference devices, the conference device can be setup in a room. For example, the conference device can be configured for use in an office, in a house, in a factory, or in a building. Further, the conference device can be configured for an outdoor setup. The particular location of the conference device is not limiting.

In one or more exemplary embodiments, the conference device can be configured for providing multiple videostreams as an output to a user. For example, the conference device can provide a field of view. This allows the user to see everything, or a significant portion, that the cameras or image sensors of the conference device are seeing. This can give a user a general sense of what the cameras would see in the particular area the conference device is located.

Further, the conference device can provide a separate videostream. This separate videostream may be based on a region of interest. The region of interest may be a desirable view by a user that can be received in conjunction with the field of view. Thus, the user could receive a broad and more generalized field of view, while also receiving a more tailored and/or focused region of interest. The region of interest may change during the videoconference, but the field of view may remain static or substantially static.

As an example, the region of interest may be a speaker, or a particular location, or a particular person. The particular region of interest is not limiting. Further, the region of interest may change over time. For example, the region of interest may change from a first person to a second person or from a first region to a second region. Alternatively, if two people are speaking at once, the region of interest may change from a focus on a single person, to a broader image of multiple people speaking at once. The region of interest may be determined by the conference device. The region of interest may be determined by the user and/or a host device. The region of interest may be determined by a machine learning and/or artificial intelligence engine.

Accordingly, in one or more exemplary conference devices, the conference device can provide two or more videostreams to a user so that they can see both a field of view as well as a region of interest. The field of view and the region of interest may be real time, generally real time, and/or live. The two or more videostreams may be interleaved and provided via a single connector.

As disclosed herein, certain components of the conference device can be in communication with one another. They may be directly in communication with each other. They may be indirectly in communication, such as through an intermediate component which may or may not be discussed herein.

The connections can be wired or wireless. The wireless communication as discussed herein may be, for example, cellular, Bluetooth, LTE, radio, PAN, LAN, WLAN, satellite, microwave, WAN, etc., and the particular wireless communication is not limiting.

The conference device may include one or more memory components configured for storage of data. Individual components of the conference device may include their own memory components for storage of data. Individual components of the conference device may share a common memory for storage of data.

In one or more exemplary conference devices, the conference device can include one or more sensors. In one or more exemplary conference devices, the conference device can include one or more image sensors, e.g. cameras, imagine device, digital camera, optical sensor, electro-optical sensor, scanner. In one or more exemplary conference devices, the conference device can be integrated with one or more sensors, such as one or more image sensors. The one or more sensors, such as the one or more image sensors, may also provide audio information to the conference device. Alternatively, or additionally, separate audio devices, e.g. microphones, can be used to provide audio information.

In one or more exemplary conference devices, the conference device can be in communication with one or more sensors. In one or more exemplary conference devices, the conference device can be in communication with one or more image sensors. Therefore, the one or more image sensors may not be a part of the conference device, but may be in communication with the conference device. Image sensors in the one or more image sensors may be configured to communicate with one another.

In one or more exemplary conference devices, the conference device can include a first image sensor. The conference device can include a first image sensor for provision of first image data. In one or more exemplary conference devices, the conference device can include a second image sensor. The conference device can include a second image sensor for provision of second image data. In one or more exemplary conference devices, the conference device can include a third image sensor. The conference device can include a third image sensor for provision of third image data. The conference device can include further image sensors as well.

The number of image sensors is not limiting, and the conference device can include, and/or be associated with, 1, 2, 3, 4, 5, 6, 7, 8, 9, or 10 image sensors. The conference device can include, and/or be associated with, greater than 1, 2, 3, 4, 5, 6, 7, 8, 9, or 10 image sensors. The conference device can include, and/or be associated with, less than 2, 3, 4, 5, 6, 7, 8, 9, or 10 image sensors. Each image sensor can provide its own image data.

The one or more image sensors may be configured for wireless transmission of image data. The one or more image sensors may be configured for wired transmission of image data.

The one or more image sensors may be charge-coupled devices. The one or more image sensors may be active-pixel sensors. The one or more image sensors may be CMOS image sensors. The one or more sensors may be digital sensors. The one or more image sensors may be a portion or an entirety of a camera. The one or more image sensors can be configured to capture visual images. The particular type of image sensor is not limiting.

The one or more image sensors may be configured to provide additional data as well. For example, the one or more image sensors may be configured to provide audio data. Therefore, the one or more image sensors may include audio capturing technology, such as microphones.

The one or more image sensors may have a particular resolution. Each of the one or more image sensors may have the same resolution. Some image sensors in the one or more image sensors may have different resolutions than other image sensors.

The one or more image sensors may have a resolution of 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 13, 15, 20, 25, 30, 35, 40, 50, 60, 70, 80, 90, 100, 150, 200, 250, 300, 350, 400, 450, or 500 megapixels (MP). The one or more image sensors may have a resolution of greater than 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 13, 15, 20, 25, 30, 35, 40, 50, 60, 70, 80, 90, 100, 150, 200, 250, 300, 350, 400, 450, or 500 megapixels (MP). The one or more image sensors may have a resolution of less than 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 13, 15, 20, 25, 30, 35, 40, 50, 60, 70, 80, 90, 100, 150, 200, 250, 300, 350, 400, 450, or 500 megapixels (MP). In one or more exemplary conference devices, the image sensors may provide image data with a resolution of 4208×3120 pixels.

Thus, the image data, such as the first image data, the second image data, the third image data, etc. may have a resolution of 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 13, 15, 20, 25, 30, 35, 40, 50, 60, 70, 80, 90, 100, 150, 200, 250, 300, 350, 400, 450, or 500 megapixels (MP). The image data, such as the first image data, the second image data, the third image data, etc. may have a resolution of greater than 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 13, 15, 20, 25, 30, 35, 40, 50, 60, 70, 80, 90, 100, 150, 200, 250, 300, 350, 400, 450, or 500 megapixels (MP). The image data, such as the first image data, the second image data, the third image data, etc. may have a resolution of less than 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 13, 15, 20, 25, 30, 35, 40, 50, 60, 70, 80, 90, 100, 150, 200, 250, 300, 350, 400, 450, or 500 megapixels (MP). In one or more exemplary conference devices, image data, such as the first image data, the second image data, the third image data, etc. may have a resolution of 4208×3120 pixels.

The one or more image sensors may be mountable. For example, the one or more image sensors may be mountable on a wall and/or a ceiling. The one or more image sensors may include accessories or other components, such as a stand.

The one or more image sensors may store the image data, such as in memory. For example, the first image sensor can store first image data. The second image sensor can store second image data. The third image sensor can store third image data. In alternative conference devices, the image sensors may not store image data.

The image data, such as the first image data, the second image data, and the third image data, may be in any format, and the particular format is not limiting. Example formats include, but are not limited to mp4, mov, avi, mkv, ts.

In one or more exemplary conference devices, the conference device may include one or more image processors, e.g. one or more image sensor processors. The image processors may be, for example, image processing units, image signal processors, processing engines, encoders, image encoders, etc.

The image processor(s) may be integrated on a chip. The image processor(s) may be integrated on a circuit. The image processor(s) may be integrated on an integrated circuit. The image processor(s) may be contained within the conference device.

The image processor(s) may store data. For example, the image processor(s) may include memory for data storage.

The one or more image processors may be in communication with the one or more image sensors. The one or more image processors may be interfaced with the one or more image sensors. For example, the Mobile Industry Processor Interface (MIPI) can be used to communicate between the one or more image sensors and the one or more image processors. However, the particular interface/standard is not limited. A CSI-1, CSI-2, CSI-3 standard can be used. Display serial interfaces can be used. Serial busses can be used. eDP and HDMI may be used.

The communication between the one or more image sensors and the one or more image processors may be wireless. The communication between the one or more image sensors and the one or more image processors may be wired.

In one or more exemplary conference devices, the conference device can include a 1:1 ratio between image sensors and image processors. Therefore, the conference device may include a first image processor. The conference device may include a second image processor. The conference device may include a third image processor. The first image processor may be in communication with the first image sensor. The second image processor may be in communication with the second image sensor. The third image processor may be in communication with the third image sensor.

Alternatively, the conference device may not include a 1:1 ratio between image sensors and image processors. Thus, more than one image sensor may be in communication with a single image processor. Further, one image sensor may be in communication with more than one image processor. In one or more exemplary conference devices, there may be a ratio of 2:1, 3:1, 4:1, 5:1, 6:1, etc. of image sensors to image processors. In one or more exemplary conference devices, there may be a ratio of 2:1, 3:1, 4:1, 5:1, 6:1, etc. of image processors to image sensors.

The number of image processors is not limiting, and the conference device can include, and or be associated with, 1, 2, 3, 4, 5, 6, 7, 8, 9, or 10 image processors. The conference device can include, and or be associated with, greater than 1, 2, 3, 4, 5, 6, 7, 8, 9, or 10 image processors. The conference device can include, and or be associated with, less than 2, 3, 4, 5, 6, 7, 8, 9, or 10 image processors.

Each of the image processors may be configured for provision of at least one videostream. For example, each of the image processors may be configured for provision of two videostreams. Each of the image processors may be configured for provision of more than two videostreams, such as 3, 4, 5, 6, 7, 8, 9, or 10 videostreams. The videostreams may be, for example, primary, secondary, tertiary, quaternary, etc. videostreams. The particular labelling of the videostreams may or may not be an indication of quality and/or importance of a particular videostream.

In one or more exemplary conference devices, the image processors may be configured for provision of the videostreams based on the image data received. So if an image processor is in communication with a particular image sensor, the videostreams may be based on the image data from the particular image sensor. Thus, multiple videostreams may be provided for each image data.

Thus, for example, a first image processor can be configured for provision of a first primary videostream and a first secondary videostream based on the first image data. A second image processor can be configured for provision of a second primary videostream and a second secondary videostream based on the second image data. A third image processor can be configured for provision of a third primary videostream and a third secondary videostream based on the third image data. In one or more exemplary conference devices, the image processors can be configured for provision of twice, three times, four times, etc. as many videostreams as image data received in the image processors.

Thus, the image processors can be used to separate two or more different videostreams from the image data. The image processors can select two or more videostreams from the image data. The image processors can portion out two or more videostreams from the image data.

In one or more exemplary conference devices, the respective primary videostream and secondary videostream may be independent, e.g. separate from one another. Thus, the first primary videostream can be independent from the first secondary videostream. In other words, the first primary videostream and the first secondary videostream may be independent from each other and/or separate videostreams. The second primary videostream can be independent from the second secondary videostream. In other words, the second primary videostream and the second secondary videostream may be independent from each other and/or separate videostreams. The third primary videostream can be independent from the third secondary videostream. In other words, the third primary videostream and the third secondary videostream may be independent from each other and/or separate videostreams.

Accordingly, in one or more exemplary conference devices, the respective secondary videostream is not a subset of the respective primary videostream. In one or more exemplary conference devices, the first secondary videostream is not a subset of the first primary videostream. In one or more exemplary conference devices, the second secondary videostream is not a subset of the second primary videostream. In one or more exemplary conference devices, the third secondary videostream is not a subset of the third primary videostream.

The secondary videostream may overlap with the primary videostream. The secondary videostream may be fully contained within the primary videostream. In one or more exemplary conference devices, the resolutions of the secondary videostream(s) and/or the primary videostream(s) may be smaller than the resolution of the original data image received/obtained from image sensors. In one or more exemplary conference devices, resolutions of the secondary videostream(s) and the primary videostream(s) may be the same size as the resolution of the original data image received.

Accordingly, the image processors can be used to modify the original image data into the primary videostream and the secondary videostream. The first image processor can modify, encode, or process the first image data into the first primary videostream and the first secondary videostream. The second image processor can modify, encode, or process the second image data into the second primary videostream and the second secondary videostream. The third image processor can modify, encode, or process the third image data into the third primary videostream and the third secondary videostream.

For example, a primary resolution of the primary videostream may be smaller than the resolution of the image data. A first primary resolution of the first primary videostream may be smaller than the resolution of the first image data. A second primary resolution of the second primary videostream may be smaller than the resolution of the second image data. A third primary resolution of the third primary videostream may be smaller than the resolution of the third image data. A secondary resolution of the secondary videostream may be smaller than the image data. A first secondary resolution of the first secondary videostream may be smaller than the resolution of the first image data. A second secondary resolution of the second secondary videostream may be smaller than the resolution of the second image data. A third secondary resolution of the third secondary videostream may be smaller than the resolution of the third image data.

Accordingly, the image processor(s) may generally prepare the views of the two streams that a user will end up seeing, for example after any later processing to the videostreams. Thus, the image processor(s) can use image control data, such as the first image control data and/or the second image control data and/or the third image control data, for provision of the first secondary videostream and/or the second secondary videostream and/or the third secondary videostream. For example, the first image control data can provide instructions to the first image processor to select a portion or region of the first image data for the first secondary videostream. This may be, for example, one or more of an area of the first image data containing a person, an area of the first image containing a person's face, and an area of the first image data containing a particular thing of interest. For example, the second image control data can provide instructions to the second image processor to select a portion or region of the second image data for the second secondary videostream. This may be, for example, one or more of an area of the second image data containing a person, an area of the second image containing a person's face, and an area of the second image data containing a particular thing of interest. For example, the third image control data can provide instructions to the third second image processor to select a portion or region of the third image data for the third secondary videostream. This may be, for example, one or more of an area of the third image data containing a person, an area of the third image containing a person's face, and an area of the third image data containing a particular thing of interest.

In one or more exemplary conference devices, a single image control data may be sent to all image processors, such as the first image processor, the second image processor, and/or the third image processor.

The first primary videostream can be a portion of the first image data. The first primary videostream can be an entirety of the first image data. The first secondary videostream can be a portion of the first image data. The first second videostream can be an entirety of the first image data. The first primary videostream and the first secondary videostream may overlap on the first image data. The first primary videostream and the first secondary videostream may not overlap on the first image data.

The second primary videostream can be a portion of the second image data. The second primary videostream can be an entirety of the second image data. The second secondary videostream can be a portion of the second image data. The second secondary videostream can be an entirety of the second image data. The second primary videostream and the second secondary videostream may overlap on the second image data. The second primary videostream and the second secondary videostream may not overlap on the second image data.

The third primary videostream can be a portion of the third image data. The third primary videostream can be an entirety of the third image data. The third secondary videostream can be a portion of the third image data. The third secondary videostream can be an entirety of the third image data. The third primary videostream and the third secondary videostream may overlap on the third image data. The third primary videostream and the third secondary videostream may not overlap on the third image data.

The primary videostreams, such as the first primary videostream and/or the second primary videostream and/or the third primary videostream, etc., may have a resolution of 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 15, 20, 25, 30, 35, 40, 50, 60, 70, 80, 90, 100, 150, 200, 250, 300, 350, 400, 450, or 500 megapixels (MP). The primary videostreams, such as the first primary videostream and/or the second primary videostream and/or the third primary videostream, etc., may have a resolution of greater than 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 15, 20, 25, 30, 35, 40, 50, 60, 70, 80, 90, 100, 150, 200, 250, 300, 350, 400, 450, or 500 megapixels (MP). The primary videostreams, such as the first primary videostream and/or the second primary videostream and/or the third primary videostream, etc., may have a resolution of less than 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 15, 20, 25, 30, 35, 40, 50, 60, 70, 80, 90, 100, 150, 200, 250, 300, 350, 400, 450, or 500 megapixels (MP). In one or more exemplary conference devices, the primary videostreams, such as the first primary videostream and/or the second primary videostream and/or the third primary videostream, etc., may have a resolution of 4208×3120 pixels. In one or more exemplary conference devices, the primary videostreams, such as the first primary videostream and/or the second primary videostream and/or the third primary videostream, etc., may have a resolution of 1600×1200 pixels.

The secondary videostreams, such as the first secondary videostream and/or the second secondary videostream and/or the third secondary videostream, etc., may have a resolution of 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 15, 20, 25, 30, 35, 40, 50, 60, 70, 80, 90, 100, 150, 200, 250, 300, 350, 400, 450, or 500 megapixels (MP). The secondary videostreams, such as the first secondary videostream and/or the second secondary videostream and/or the third secondary videostream, etc., may have a resolution of greater than 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 15, 20, 25, 30, 35, 40, 50, 60, 70, 80, 90, 100, 150, 200, 250, 300, 350, 400, 450, or 500 megapixels (MP). The secondary videostreams, such as the first secondary videostream and/or the second secondary videostream and/or the third secondary videostream, etc., may have a resolution of less than 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 15, 20, 25, 30, 35, 40, 50, 60, 70, 80, 90, 100, 150, 200, 250, 300, 350, 400, 450, or 500 megapixels (MP). In one or more exemplary conference devices, the secondary videostreams, such as the first secondary videostream and/or the second secondary videostream and/or the third secondary videostream, etc., may have a resolution of 4208×3120 pixels. In one or more exemplary conference devices, the secondary videostreams, such as the first secondary videostream and/or the second secondary videostream and/or the third secondary videostream, etc., may have a resolution of 1920×1080 pixels. In one or more exemplary conference devices, the secondary videostreams, such as the first secondary videostream and/or the second secondary videostream and/or the third secondary videostream, etc., may have a resolution up to the resolution of the image sensors, first image data, the second image data, and the third image data respectively.

The image processor(s) may be configured to provide any one of a number of functions to the image data. For example, the image processor(s) can be configured to perform one or more of Bayer transformation, demosaicing, noise reduction, image sharpening, etc. The particular processing function performed is not limiting.

In one or more exemplary conference devices, the conference device may include one or more intermediate processors, e.g. one or more intermediate image processors. The intermediate image processors may be, for example, processing engines, encoders, image encoders, etc.

The intermediate image processor(s) may store data. For example, the intermediate image processor(s) may include memory for data storage.

The intermediate image processor(s) may be integrated on a chip. The intermediate image processor(s) may be integrated on a circuit. The intermediate image processor(s) may be integrated on an integrated circuit. The intermediate image processor(s) may be integrated onto a field-programmable gate array.

The intermediate image processor(s) may be on the same chip and/or circuit and/or integrated circuit as the image processors. The intermediate image processor(s) may be on a different chip and/or circuit and/or integrated circuit as the image processors.

The one or more intermediate image processors may be in communication with the one or more image processors. The one or more intermediate image processors may be interfaced with the one or more image processors. For example, the Mobile Industry Processor Interface (MIPI) can be used to communication between the one or more image processors and the one or more intermediate image processors. However, the particular interface/standard is not limited. A CSI-1, CSI-2, CSI-3 standard can be used. Display serial interfaces can be used. Serial busses can be used. eDP and HDMI may be used.

The communication between the one or more image processors and the one or more intermediate image processors may be wireless. The communication between the one or more image processors and the one or more intermediate image processors may be wired.

In one or more exemplary conference devices, the conference device may include a single intermediate image processor. The intermediate image processor may be configured to receive the primary and secondary videostreams, such as discussed above. Thus, the intermediate image processor can be configured to receive the first primary videostream and/or the second primary videostream and/or the third primary videostream and/or the first secondary videostream and/or the second secondary videostream and/or the third secondary videostream.

Alternatively, in one or more exemplary conference devices, the conference device can include a 1:1 ratio between intermediate image processors and image processors.

Therefore, the conference device may include a first intermediate image processor. The conference device may include a second intermediate image processor. The conference device may include a third intermediate image processor. The first image processor may be in communication with the first intermediate image processor. The second image processor may be in communication with the second intermediate image processor. The third image processor may be in communication with the third intermediate image processor.

The number of intermediate image processors is not limiting, and the conference device can include, and or be associated with, 1, 2, 3, 4, 5, 6, 7, 8, 9, or 10 intermediate image processors. The conference device can include, and or be associated with, greater than 1, 2, 3, 4, 5, 6, 7, 8, 9, or 10 intermediate image processors. The conference device can include, and or be associated with, less than 2, 3, 4, 5, 6, 7, 8, 9, or 10 intermediate image processors.

Thus, the intermediate image processor can be in communication with the first image processor. The intermediate image processor can be in communication with the second image processor. The intermediate image processor can be in communication with the third image processor. The intermediate image processor can be in communication with the first image processor and/or the second image processor and/or the third image processor.

The intermediate image processor can be configured for provision of a field-of-view videostream, for example a room videostream. The intermediate image processor can be configured for provision of a region-of-interest videostream. The intermediate image processor can be configured for provision of a field-of-view videostream and a region-of-interest videostream.

The field-of-view videostream may have a resolution of 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 13, 15, 20, 25, 30, 35, 40, 50, 60, 70, 80, 90, 100, 150, 200, 250, 300, 350, 400, 450, or 500 megapixels (MP). The field-of-view videostream may have a resolution of greater than 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 13, 15, 20, 25, 30, 35, 40, 50, 60, 70, 80, 90, 100, 150, 200, 250, 300, 350, 400, 450, or 500 megapixels (MP). The field-of-view videostream may have a resolution of less than 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 13, 15, 20, 25, 30, 35, 40, 50, 60, 70, 80, 90, 100, 150, 200, 250, 300, 350, 400, 450, or 500 megapixels (MP). In one or more exemplary conference devices, the field-of-view videostream may have a resolution of 4208×3120 pixels.

The region-of-interest videostream may have a resolution of 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 13, 15, 20, 25, 30, 35, 40, 50, 60, 70, 80, 90, 100, 150, 200, 250, 300, 350, 400, 450, or 500 megapixels (MP). The region-of-interest videostream may have a resolution of greater than 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 13, 15, 20, 25, 30, 35, 40, 50, 60, 70, 80, 90, 100, 150, 200, 250, 300, 350, 400, 450, or 500 megapixels (MP). The region-of-interest videostream may have a resolution of less than 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 13, 15, 20, 25, 30, 35, 40, 50, 60, 70, 80, 90, 100, 150, 200, 250, 300, 350, 400, 450, or 500 megapixels (MP). In one or more exemplary conference devices, the region-of-interest videostream may have a resolution of 4208×3120 pixels.

The field-of-view videostream can be based on the first primary videostream. The field-of-view videostream can be based on the second primary videostream. The field-of-view videostream can be based on the third primary videostream. The field-of-view videostream can be based on the first primary videostream and the second primary videostream. The field-of-view videostream can be based on the first primary videostream and the third primary videostream. The field-of-view videostream can be based on the third primary videostream and the second primary videostream. The field-of-view videostream can be based on the first primary videostream and the second primary videostream and the third primary videostream.

In one or more exemplary conference devices, the field-of-view videostream can be combined, e.g. stitched, from a number of videostreams. The intermediate image processor can perform the combining and/or stitching. One or more stitching engines may be used. The field-of-view videostream can be stitched from the first primary videostream, the second primary videostream, and the third primary videostream. The field-of-view videostream can be stitched from the first primary videostream and the second primary videostream. The field-of-view videostream can be stitched from the first primary videostream and the third primary videostream. The field-of-view videostream can be stitched from the third primary videostream and the second primary videostream. The field-of-view videostream may be combined, e.g. stitched from any number of videostreams.

The region-of-interest videostream can be based on one or more of the first secondary videostream and the second secondary videostream. The region-of-interest videostream can be based on one or more of the first secondary videostream, the second secondary videostream, and the third secondary videostream. The region-of-interest videostream can be based on the first secondary videostream. The region-of-interest videostream can be based on the second secondary videostream. The region-of-interest videostream can be based on the third secondary videostream. The region-of-interest videostream can be based on the first secondary videostream and the second secondary videostream. The region-of-interest videostream can be based on the first secondary videostream and the third secondary videostream. The region-of-interest videostream can be on based the third secondary videostream and the second secondary videostream. The region-of-interest videostream can be based on the first secondary videostream, the second secondary videostream, and the third secondary videostream. The region-of-interest videostream can be based on the first secondary videostream and/or the second secondary videostream and/or the third secondary videostream.

The intermediate image processor can be configured to select from the secondary videostreams, such from the first secondary videostream, the second secondary videostream, and the third secondary videostream. Thus, only one of the secondary videostreams may be used. For example, the intermediate image processor can be configured to select one of the first secondary videostream, the second secondary videostream, and the third secondary videostream for the region-of-interest videostream. In other words, the intermediate image processor can be configured to stitch together the first primary videostream, the second primary videostream, and the third primary video stream for provision of the field-of-view videostream.

In one or more exemplary conference devices, the intermediate image processor may receive region-of-interest selection control data, discussed in detail below. Thus, the intermediate image processor may use the region-of-interest selection control data to select a particular one of the first secondary videostream, the second secondary videostream, and the third secondary videostream for provision of the region-of-interest videostream.

As an example, the region-of-interest selection control data may indicate that the region-of-interest may fall within the second secondary videostream. Thus, the second secondary videostream can be selected by the intermediate image processor for the region-of-interest videostream.

Further, the region-of-interest selection control data may vary throughout a videostream. Thus, the region-of-interest selection control data may first indicate to select the second secondary videostream. The region-of-interest selection control data may then be adjusted to select the first secondary videostream. The region-of-interest selection control data may then be adjusted to select the second secondary videostream once again. Each region-of-interest selection control data provided may be considered the same region-of-interest selection control data, or may be designated first, second, third, etc. such as first region-of-interest selection control data.

Alternatively, the intermediate image processor may be configured to combine, e.g., stitch, the secondary videostreams. For example, the intermediate image processor may be configured to combine, such as stitch together, the first secondary videostream and the second secondary videostream. The intermediate image processor may be configured to combine, such as stitch together, the first secondary videostream and the third secondary videostream. The intermediate image processor may be configured to combine, such as stitch together, the second secondary videostream and the third secondary videostream. The intermediate image processor may be configured to combine, such as stitch together, the first secondary videostream, the second secondary videostream, and the third secondary videostream. Thus, the region-of-interest videostream may be combined, such as stitched, from the first secondary videostream, the second secondary videostream, and the third secondary videostream. If all secondary videostreams are combined, e.g. stitched, the intermediate image processor may not receive region-of-interest selection control data.

The intermediate image processor may perform image processing on the primary and/or secondary videostreams, such as one or more of the first primary videostream, the second primary videostream, the third primary videostream, the first secondary videostream, the second secondary videostream, and the third secondary videostream. The intermediate image processor may perform image processing on the field-of-view videostream and/or the region-of-interest videostream. The intermediate image processor may perform signal processing on the primary and/or secondary videostreams, such as one or more of the first primary videostream, the second primary videostream, the third primary videostream, the first secondary videostream, the second secondary videostream, and the third secondary videostream. The intermediate image processor may perform signal processing on the field-of-view videostream and/or the region-of-interest videostream. For example, the intermediate image processor may perform one or more of geometric correction or transformation, noise reduction, and chroma subsampling on the primary and/or secondary videostream(s).

In one or more exemplary conference devices, the conference device may include one or more output processors. The output processor(s) may be or comprise, for example, processing engines, encoders, image encoders, etc.

The output processor(s) may be integrated on a chip. The output processor(s) may be integrated on a circuit. The output processor(s) may be integrated on an integrated circuit. The output processor(s) may be integrated onto a field-programmable gate array.

The output processor(s) may be on the same chip and/or circuit and/or integrated circuit as the image processors. The output processor(s) may be on a different chip and/or circuit and/or integrated circuit as the image processors.

The output processor(s) may be on the same chip and/or circuit and/or integrated circuit as the intermediate image processors. The output processor(s) may be on a different chip and/or circuit and/or integrated circuit as the intermediate image processors.

The output processor(s) may store data. For example, the output processor(s) may include memory for data storage.

The one or more output processors may be in communication with the one or more intermediate image processors, such as the intermediate image processor. The one or more output processors may be interfaced with the one or more intermediate image processors. For example, the Mobile Industry Processor Interface (MIPI) can be used to communication between the one or more output processors and the one or more intermediate image processors. However, the particular interface/standard is not limited. A CSI-1, CSI-2, CSI-3 standard can be used.

The communication between the one or more output processors and the one or more intermediate image processors may be wireless. The communication between the one or more output processors and the one or more intermediate image processors may be wired.

The one or more output processors may be in communication with the one or more image processors, such as the first image processor and/or the second image processor and/or the third image processor. The one or more output processors may be interfaced with the one or more image processors, such as the first image processor and/or the second image processor and/or the third image processor. For example, the Mobile Industry Processor Interface (MIPI) can be used to communication between the one or more output processors and the one or more image processors. However, the particular interface/standard is not limited. A CSI-1, CSI-2, CSI-3 standard can be used. Display serial interfaces can be used. Serial busses can be used. eDP and HDMI may be used.

The communication between the one or more output processors and the one or more image processors may be wireless. The communication between the one or more output processors and the one or more image processors may be wired.

In one or more exemplary conference devices, the conference device may include a single output processor. The output processor may be configured to receive the field-of-view videostream. The output processor may be configured to receive the region-of-interest videostream. Thus, the output processor can be configured to receive the field-of-view videostream and/or the region-of-interest videostream.

Alternatively, in one or more exemplary conference devices, the conference device can include a 1:1 ratio between output processors and image processors. In one or more exemplary conference devices, the conference device can include a 1:1 ratio between output processors and intermediate image processors.

The number of output processors is not limiting, and the conference device can include, and or be associated with, 1, 2, 3, 4, 5, 6, 7, 8, 9, or 10 output processors. The conference device can include, and or be associated with, greater than 1, 2, 3, 4, 5, 6, 7, 8, 9, or 10 output processors. The conference device can include, and or be associated with, less than 2, 3, 4, 5, 6, 7, 8, 9, or 10 output processors.

In one or more exemplary conference devices, the output processor can be configured to provide a primary output videostream. The primary output videostream can be based on the field-of-view videostream. The primary output videostream can be based on the region-of-interest videostream. For example, the output processor can be configured to provide a primary output videostream based on the field-of-view videostream or the region-of-interest videostream.

In one or more exemplary conference devices, the output processor can be configured to provide a secondary output videostream. The secondary output videostream can be based on the field-of-view videostream. The secondary output videostream can be based on the region-of-interest videostream. For example, the output processor can be configured to provide a secondary output videostream based on the field-of-view videostream or the region-of-interest videostream.

In one or more exemplary conference devices, the output processor includes an interface, e.g. output interface, videostream interface. The output interface can be configured for provision of a primary output videostream. The primary output videostream can be based on the field-of-view videostream. The output interface can be configured for provision of a secondary output videostream. The secondary output videostream can be based on the region-of-interest videostream. The output interface can be configured for provision of the primary output videostream and the secondary output videostream. The output interface can be configured for further output videostreams, such as tertiary output videostream, quaternary output videostream, etc.

In one or more exemplary conference devices, the primary output videostream can have a particular field of view. For example, the primary output videostream can have a field of view of at least 90, 100, 110, 120, 130, 140, 150, 160, 170, 180, 190, 200, 210, 220, 230, 240, 250, 260, 270, 280, 290, 300, 310, 320, 330, 340, 350, or 360°. The primary output videostream can have a field of view of less than 90, 100, 110, 120, 130, 140, 150, 160, 170, 180, 190, 200, 210, 220, 230, 240, 250, 260, 270, 280, 290, 300, 310, 320, 330, 340, 350, or 360°. In one or more exemplary conference devices, the primary output videostream may have a field of view of in the range from 120° to 200° (horizontal), such as in the range from 150° to 180°.

In one or more exemplary conference devices, the secondary output videostream can have a particular field of view. For example, the secondary output videostream can have a field of view of at least 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, or 360°. The secondary output videostream can have a field of view of less than 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, or 360°.

In one or more exemplary conference devices, the primary output videostream can have a field of view of at least 120°, such as at least 150° and the secondary output videostream can have a field of view less than 90°.

The primary output videostream can have the same field of view as the secondary output videostream. The primary output videostream can have a different field of view as the secondary output videostream. The primary output videostream can have a greater field of view than the secondary output videostream. The primary output videostream can have a lesser field of view than the secondary output videostream.

The primary output videostream can have a field of view 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 times greater than a field of view of the secondary output videostream (horizontal). The secondary output videostream can have a field of view 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 times greater than a field of view of the primary output videostream.

The output processor may be configured to process the field-of-view videostream. The output processor may be configured to process the region-of interest videostream. The output processor may be configured to process the field-of-view videostream and the region-of interest videostream.

The processing may be any number of different processes. For example, the output processor can be configured to perform one or more of image transformation, distortion correction, enhancement, contrast correction. The output processor can be configured to perform one or more of image transformation, distortion correction, enhancement, contrast correction on the region-of-interest videostream to provide the secondary output videostream. The output processor can be configured to perform one or more of image transformation, distortion correction, enhancement, perspective adjustment, contrast correction on the field-of-view videostream to provide the primary output videostream. The output processor can provide further signal processing, such as noise reduction and/or chroma subsampling on the field-of-view videostream and/or on the region-of-interest videostream. In one or more exemplary conference devices, the output processor can be configured to "whiteboard" the region-of-interest videostream to the secondary output videostream. Therefore, the output processor can provide perspective adjustment in order to frame the videostream for a user so it appears that the user is looking at the region-of-interest, such as a whiteboard, head on. This can be done even if the original image data is set at an angle.

The output processor can include further functionality as well. For example, the output processor can perform optical character recognition on any text within the field-of-view videostream and/or the region-of-interest videostream. The output processor can further perform object extraction on the field-of-view videostream and/or on the region-of-interest videostream. The output processor can further perform object manipulation on the field-of-view videostream and/or on the region-of-interest videostream. The output processor can compensate for missing light on the field-of-view videostream and/or on the region-of-interest videostream.

As mentioned above, the output processor can be configured to performed image processing on the field-of-view videostream and/or on the region-of-interest videostream. Alternatively, or in combination with the processing, the output processor can be configured to provide control data to other components within the conference device. For example, as discussed above the output device can be in communication with one or more of the intermediate module and the image processors, e.g. the first image processor, the second image processor, and the third image processor.

In one or more exemplary conference devices, the output processor is configured to determine image control data, e.g. image control instructions, image control information. The image control data can be indicative of a region of interest. The output processor can then transmit and/or communicate the image control data. The control data, such as first image control data, second image control data, and/or third image control data, can include instructions, parameters, criteria, etc. to the respective image processor.

The first image control data can be indicative of a region of interest, such as one or more of position, size, and shape of the region-of-interest, in the first image data. The second image control data can be indicative of a region of interest, such as one or more of position, size, and shape of the region-of-interest, in the second image data. The third image control data can be indicative of a region of interest, such as one or more of position, size, and shape of the region-of-interest, in the second image data.

As an example, the output processor can be configured to determine first image control data. The first image control data can be based on the field-of-view videostream. The first image control data may not be based on the field-of-view videostream. The first image control data can be based on the region-of-interest videostream. The first image control data may not be based on the region-of-interest videostream. In one or more exemplary conference devices, the first image control data may be based on user input or external control input, e.g. from a host device.

The output processor can then transmit the first image control data to the first image processor. As discussed above, the first image processor can be configured for provision of the first secondary videostream based on the first image control data. Further, the first image processor can be configured for provision of the first primary videostream based on the first image control data. In one or more exemplary conference devices, the output processor can be in communication with the intermediate image processor and configured to determine first image control data based on the field-of-view videostream and configured to transmit the first image control data to the first image processor.

Further, the output processor can be configured to determine second image control data. The second image control data can be based on the field-of-view videostream. The second control data may not be based on the field-of-view videostream. In one or more exemplary conference devices, the second image control data may be based on user input or external control input, e.g. from a host device. Further, the second image processor can be configured for provision of the second primary videostream based on the second image control data. The output processor can then transmit the second image control data to the second image processor. The second image processor can be configured for provision of the second secondary videostream based on the second image control data.

The output processor may also be configured to determine third image control data. The third image control data can be based on the field-of-view videostream. The third image control data may not be based on the field-of-view videostream. In one or more exemplary conference devices, the third image control data may be based on user input or external control input, e.g. from a host device. Further, the third image processor can be configured for provision of the third primary videostream based on the third image control data. The output processor can then transmit the third image control data to the third image processor. The third image processor can be configured for provision of the third secondary videostream based on the third image control data.

In one or more exemplary conference devices, the output processor may determine and/or transmit/communication image control data, such as the first image control data, the second image control data, and/or the third image control data. As discussed, the image control data may be used to adjust the secondary output to be provided, which is based on the region-of-interest videostream. Thus, the field-of-vision videostream can be utilized to determine particular regions of interest within the field-of-vision videostream.

Thus, the output processor can be configured to determine control data, such as the first image control data, the second image control data, and/or the third image control data. For example, the output processor may analyze the field-of-view videostream for a particular person in the field-of-view videostream that is speaking. It therefore may be advantageous for the region of interest to focus on the person speaking. Accordingly, the output processor can determine control data regarding the particular person speaking from the field-of-view videostream. Other region-of-interests can be used as well. For example, people speaking, particular locations, an area where a presentation is being given, a whiteboard/blackboard, etc.

The output processor can then transmit the image control data to the particular image processor for the provision of the secondary videostream. In one or more exemplary conference devices, the output processor can transmit the first image control data to the first image processor for the provision of the first secondary videostream. In one or more exemplary conference devices, the output processor can transmit the second image control data to the second image processor for the provision of the second secondary videostream. In one or more exemplary conference devices, the output processor can transmit the third image control data to the third image processor for the provision of the third secondary videostream.

Thus, the control data can provide instructions to the image processor(s), via the image control data, for focusing on a particular region of interest in the image data, such as the first image data, the second image data, and the third image data. The particular image processor can then provide the more focused secondary videostream, such as the first secondary videostream, the second secondary videostream, and/or the third secondary videostream to the intermediate image processor.

In one or more exemplary conference devices, the output processor can transmit the first image control data to the first image processor for the provision of the first primary videostream. In one or more exemplary conference devices, the output processor can transmit the second image control data to the second image processor for the provision of the second primary videostream. In one or more exemplary conference devices, the output processor can transmit the third image control data to the third image processor for the provision of the third primary videostream.

Thus, the control data can provide instructions to the image processor(s), via the image control data, for focusing on a particular field of view in the image data, such as the first image data, the second image data, and the third image data. The particular image processor can then provide the more focused primary videostream, such as the first primary videostream, the second primary videostream, and/or the third primary videostream to the intermediate image processor.

Advantageously, the output processor allows for focus of a particular region of interest, and can provide instructions to the image processor to do so. The output processor can transmit the control data only to the relevant image processor. For example, if the region of interest is only found within the view of the second image sensor, the output processor can transmit the second control data to the second image processor. If there were three image sensors, the output processor may not transmit first control data to the first image processor nor transmit third control data to the third image processor as no changes would be made to the first and third image processor.

In one or more exemplary conference devices, the output processor can transmit the control data to all available image processors, even if the particular image processor would not need to make further adjustments. Thus, if there were three image sensors, the output processor can provide first image control data to the first image processor, and can provide second image control data to the second image processor, and can provide third image control data to the third image processor.

In one or more exemplary conference devices, the output processor can be configured to determine region-of-interest selection control data. The output processor can transmit the region-of-interest selection control data to the intermediate image processor.

In one or more exemplary conference devices, the intermediate image processor can be configured to stitch together the secondary videostreams, such as the first secondary videostream, the second secondary videostream and/or the third secondary videostream, for provision of the region-of-interest videostream. Alternatively, the intermediate image processor may select from one of the first secondary videostream, the second secondary videostream and/or the third secondary videostream for provision of the region-of-interest videostream. Thus, the region-of-interest videostream may only be based on the image data from one of the image sensors.

Accordingly, in one or more exemplary conference devices the output processor can transmit the region-of-interest selection control data to the intermediate image processor.

The region-of-interest selection control data may be used to select which of the secondary videostreams, such as the first secondary videostream, the second secondary videostream and/or the third secondary videostream, to select for provision of the region-of-interest videostream.

In one or more exemplary conference devices, the output processor may analyze the field-of-view videostream for a particular person in the field-of-view videostream that is speaking. It therefore may be advantageous to select the secondary videostream which contains the person speaking. Accordingly, the output processor can determine region-of-interest selection control data regarding the particular person speaking from the field-of-view videostream.

However, the region-of-interest selection control data need not be based on the field-of-view videostream. The output processor can make its own determinations, such as through the use of a machine learning engine discussed below. Further, user input or external control input, e.g. from a host device, may be included for determination of the region-of-interest selection control data.

Thus, the region-of-interest selection control data can provide instructions to the intermediate image processor, via the control data, for selecting the particular secondary videostream for provision of the region-of-interest videostream. The intermediate image processor can then select the best secondary videostream, such as the first secondary videostream, the second secondary videostream, and/or the third secondary videostream.

Thus, the region-of-interest selection control data can include instructions, parameters, criteria, etc. for the intermediate image processor.

In one or more exemplary conference devices, the output processor can include a machine learning engine, e.g. artificial intelligence (A.I.) engine. In one or more exemplary conference devices, the output processor can be associated with a machine learning engine. Thus, the output processor and/or the machine learning engine can have provision of a machine learning output. The first image control data can at least be partially based on the machine learning output. The region-of-interest selection control data can at least be partially based on the machine learning output. The first image control data and/or the region-of-interest selection control data can be at least partially based on the machine learning output.

In one or more exemplary conference devices, the second image control data and/or the third image control data can at least be partially based on the machine learning output.

Accordingly, the machine learning engine can be used for certain determinations of control data in the conference device. For example, the machine learning engine can select a person speaking and provide machine learning output indicative of an area of a person speaking to the output processor. The output processor can use the machine learning output to determine the region-of-interest selection control data so that the proper secondary videostream is selected and/or combined. Further, the output processor can use the machine learning output to determine the image control data so that the image processor can properly focus on the person speaking. The output processor can determine both the region-of-interest selection control data and the image control data from the machine learning output. The output processor can determine only the region-of-interest selection control data or the image control data from the machine learning output.

In one or more exemplary conferences devices, the machine learning output can include a region-of-interest selection machine learning output. The output processor can then utilize the region-of-interest selection machine learning output for determination of the region-of-interest selection control data.

In one or more exemplary conferences devices, the machine learning output can include an image control machine learning output. The output processor can then utilize the image control machine learning output for determination of the image control selection control data, such as the first image control data, the second image control data, and/or the third image control data.

In one or more exemplary conferences devices, the machine learning output can be used to determine both the region-of-interest selection control data and the image control data, such as the first image control data, the second image control data, and/or the third image control data.

In one or more exemplary conference devices, the conference device may include an interface. The interface may be in communication with the output interface and/or the output processor. The interface may be in communication with the output interface. The interface may be in communication with the output processor.

The interface may include one or more connectors, e.g. ports, attachments, cables, outputs, inputs, male connectors, female connectors. The type of connector is not limiting. The one or more connectors can be configured to, for example, receive and/or supply electricity, receive and/or supply electrical signals, receive and/or supply video signals or videostreams, receive and/or supply electrical data, receive and/or supply data, and/or receive and/or supply information.

The one or more connectors may include a first connector. The one or more connectors may include a second connector. The one or more connectors may include a third connector, a fourth connector, a fifth connector, a sixth connector, a seventh connector, an eighth connector, a ninth connector, a tenth connector, etc. The first connector may be different from the second connector. The first connector may be the same as the second connector.

The connectors, e.g. ports, first connector, second connector, can include, for example, VGA connectors, Ethernet connectors, Thunderbolt connectors, DVI connectors, ethernet connectors, COAX connectors, composite connectors, component connectors, USB connectors, 3.5 mm audio connectors, HDMI connectors, PS/2 connectors, USB-C connectors, parallel connectors, and Display Port connectors. Any of the described connectors may be inputs or outputs or both. The particular connectors, e.g. plugs, ports, attachments, is not limiting.

The conference device can be configured for provision of the primary output videostream via the first connector. The conference device can be configured for provision of the secondary output videostream via the first connector. The conference device can be configured for provision of metadata, e.g. data not included in the videostreams, via the first connector. Metadata can include many types of data. For example, the metadata can include a count of people in the videostreams. The metadata can include people's faces in the videostream. The metadata can include discovered text in the videostream. For example, if there is text on any of the videostreams, the conference device can output the text in the metadata. Accordingly, the first connector can provide both the field-of-view and the region-of-interest.

In one or more exemplary conference devices, the conference device may be configured for provision of the primary output videostream, the secondary output videostream, and a metadata output via the first connector. The conference device may be configured for provision of the primary output videostream and the secondary output videostream via the first connector. The first connector may be a single connector. Thus, the primary output videostream, the secondary output videostream, and the metadata output may all be provided via a single connector. Further, the primary output videostream and the secondary output videostream may all be provided via a single connector. In alternative conference devices, the primary output videostream may be provided via a first connector and the secondary output videostream may be provided via a second connector.

In one or more exemplary conference devices, the interface may output the primary output videostream and the secondary output videostream simultaneously (or approximately simultaneously), e.g. coincidently, contemporaneously. Alternatively, the output may not be simultaneous, but the output may be fast enough so that a user would believe the output of the videostreams would be simultaneous. The interface may output an interleaved primary output videostream and secondary output videostream.

In one or more exemplary conference devices, the components discussed above can be in a single housing, e.g. a conference device housing. The conference device housing may be a single unit. The conference device housing may be multiple units, e.g. components, attached together.

For example, the first image sensor and/or the second image sensor and/or the third image sensor may be within or on the conference device housing. The first image processor and/or the second image processor and/or the third image processor may be within the conference device housing. The intermediate image processor may be within the conference device housing. The output processor may be within the conference device housing. The first image sensor, the second image sensor, the third image sensor, the first image processor, the second image processor, the third image processor, intermediate image processor, and the output processor may be within and/or on the conference device housing. The first image sensor, the second image sensor, the third image sensor, the first image processor, the second image processor, the third image processor, intermediate image processor, and the output processor may be associated with the conference device housing. The interface and/or the one or more connectors may be on and/or within the housing.

In one or more exemplary conference devices, the image sensors, e.g. the first image sensor, the second image sensor, and the third image sensor, may be separate from the conference device housing.

The conference device and/or conference device housing may include further ports, e.g. plugs, connectors, attachments. For example, the conference device and/or conference device housing may include one or more of power connectors, audio inputs, audio outputs, Bluetooth outputs, wireless outputs, wired connectors, ethernet connectors, secondary device connectors, and intermediate device connectors. These connectors, e.g. ports, can include, for example, VGA connectors, Ethernet connectors, Thunderbolt connectors, DVI connectors, ethernet connectors, COAX connectors, composite connectors, component connectors, USB connectors, 3.5 mm audio connectors, HDMI connectors, PS/2 connectors, USB-C connectors, parallel connectors, and Display Port connectors. Any of the described connectors may be inputs or outputs or both. The particular ports, e.g. plugs, connectors, attachments, is not limiting. In one or more exemplary conference devices, the conference device can include connectors for attachment to a sound bar.

Advantageously, one or more of the exemplary conference devices can allow for simplified use by a user. For example, the conference device can be "plug and play". Accordingly, a user may need to only to plug the conference device into a host computer, e.g. host machine, user machine, user computer, host tablet, host laptop, in order to run the multi-videostreaming on the host computer.

The conference device can be used with any video platform, e.g. videostreaming platform, end platform. For example, the conference device can be used with Teams, Zoom, Skype, etc., and the particular video platform for the user is not limiting. Thus, a user need not have an expensive and/or high-powered device to run the multiple streams from the conference device.

Accordingly, one or more exemplary conference devices is modular. Therefore, the conference device can be incorporated into many different systems, and used with many different types of host computers/devices.

As mentioned above, the conference device can accept inputs, e.g., commands, user input, from a user. The user input can be received by the conference device in any number of ways. For example, a user can operate a user machine, e.g. host machine or host computer, such as a computer, phone, tablet, laptop, etc., to provide the user input to the conference device. The user input can be received wirelessly. The user input can be received wirelessly. A user may use a controller associated with the conference device to provide user input. The conference device may provide for an interface and/or output of the user input and/or any results of the user input.

The user can provide user input into the conference device itself. Accordingly, the conference device may include one or more actuators, e.g. buttons, knobs, switches, touchscreen, to operate and/or input into the conference device. The conference device may include one or more displays for outputting information to a user. The conference device may include a keyboard, or any other mechanism for the user to input commands into the conference device.

The user may provide user input continuously throughout the use of the conference device. Thus, the user may be able to adjust, for example, the region-of-interest, e.g. the secondary output videostream, that the user wishes to view during the videostreaming. The user may be able to make real-time adjustments.

Alternatively, the user may be locked out of providing user input, e.g. once the conference device is in use, e.g. during a conference.

The conference device may include default, e.g. standardized, user input if the user does not provide anything additional. This may be stored in the conference device. For example, the conference device may have memory. Further, the default user input can be used by the machine learning engine.

In one or more exemplary conference devices, the conference device is configured to receive user input. The first image control data and/or the region-of-interest selection control data can be at least partially based on the user input. The first image control data can be at least partially based on the user input. The second image control data can be at least partially based on the user input. The third image control data can be at least partially based on the user input. The region-of-interest selection control data can be at least partially based on the user input.

Accordingly, the user input can be used for certain determinations of control data in the conference device. For example, the user input can indicate a region of interest is a person speaking. The output processor can use the user input to determine the region-of-interest selection control data so that the proper secondary videostream is selected. Further, the output processor can use the user input to determine the image control data so that the image processor can properly focus on the person speaking. The output processor can determine both the region-of-interest selection control data and the image control data from the user input. The output processor can determine only the region-of-interest selection control data or the image control data from the user input.

The output processor can then utilize the user input for determination of the region-of-interest selection control data. The output processor can then utilize the user input for determination of the image control data, such as the first image control data, the second image control data, and/or the third image control data. In one or more exemplary conferences devices, the user input can be used to determine both the region-of-interest selection control data and the image control data, such as the first image control data, the second image control data, and/or the third image control data.

Further disclosed herein are methods for achieving high quality multi-videostreaming capabilities.

In one or more exemplary methods, the method can include acquiring image data. For example, the method can include acquiring first image data, acquiring second image data, and/or acquiring third image data.

In one or more exemplary methods, the method can include outputting image data. For example, the method can include outputting first image data, outputting second image data, and/or outputting third image data. The number of image data may be based on, for example, the number of image sensors used. Thus, the method can include outputting first image data from the first image sensor and/or second image data from the second image sensor and/or third image data from the third image sensor.

The respective output data can be output to an image processor. Each output data can be output to a particular image processor. Thus, the first image data can be output to a first image processor, the second image data can be output to a second image processor, and/or the third image data can be output to a third image processor. Further, the first image data can be received by a first image processor, the second image data can be received by a second image processor, and/or the third image data can be received by a third image processor.

The method can further include splitting the image data. For example, each image processor can split the respective image data into 2, 3, 4, 5, or 6 videostreams, such as primary and secondary videostreams. In one example, the method can include splitting the first image data to a first primary videostream and a first secondary videostream. If more image data is used, the method can include splitting the second image data to a second primary videostream and a second secondary videostream, and/or the method can include splitting the third image data to a third primary videostream and a third secondary videostream.

The primary and secondary videostreams can be output to an intermediate image processor. Thus, the image processor can output its respective primary and secondary videostreams to the intermediate image processor. The first primary and secondary videostreams can be output to an intermediate image processor. The second primary and secondary videostreams can be output to an intermediate image processor. The third primary and secondary videostreams can be output to an intermediate image processor. The first primary and secondary videostreams can be received by an intermediate image processor. The second primary and secondary videostreams can be received by an intermediate image processor. The third primary and secondary videostreams can be received by an intermediate image processor.

Following, the method can include performing signal and/or image processing on the primary and secondary videostreams. In one or more exemplary methods, the method can include stitching, e.g. combining, all primary videostreams together. Thus, the first primary videostream and/or the second primary videostream and/or the third primary videostream can be combined or stitched together. The first primary videostream and/or the second primary videostream and/or the third primary videostream can be combined or stitched together for providing a field-of-view videostream. The method can further include assorted processing, such as noise reduction or quality control on the primary videostream(s).

In one or more exemplary methods, the method can include stitching, e.g. combining, all secondary videostreams together. The first secondary videostream and/or the second secondary videostream and/or the third secondary videostream can be combined or stitched together for providing a region-of-interest videostream. Alternatively, the method can include selecting one of the secondary videostreams. The method can include selecting one of the first secondary videostream, the second secondary videostream, and the third secondary videostream for providing a region-of-interest videostream. The method can also include performing processing, such as noise reduction, etc., on the secondary videostreams(s).

The method can include outputting a field-of-view videostream based on the primary videostreams. The field-of-view videostream may be based on all of the primary videostreams.

The method can also include outputting a region-of-interest videostream based on one or more of the secondary videostreams.

The method can include outputting the field-of-view videostream and the region-of-interest videostream to an output processor. The method can include receiving the field-of-view videostream and the region-of-interest videostream by the output processor.

The method can then include image and/or signal processing of the field-of-view videostream and/or the region-of-interest videostream. In one or more exemplary methods, the method can include outputting a primary output videostream based on the field-of-view videostream and/or a secondary output videostream based on the region-of-interest videostream. The method can further include outputting metadata. The outputting of the primary output videostream and the secondary output videostream may be to user equipment, such as a user machine. The outputting of the primary output videostream and the secondary output videostream may be via one or more connectors, such as a first connector.

In one or more exemplary methods, the method can further include determining image control data. The image control data may be based on the field-of-view videostream. The image control data may be determined in the output processor. The image control data may be output and/or transmitted to one of the image processors. The image control data may be output and/or transmitted via the output processor. The method can include determining a first image control data, a second image control data, and a third image control data. The method can include outputting and/or transmitting the first image control data to the first image processor. The method can include outputting and/or transmitting the second image control data to the second image processor. The method can include outputting and/or transmitting the third image control data to the third image processor. The method can include receiving the first image control data by the first image processor. The method can include receiving the second image control data by the second image processor. The method can include receiving the third image control data by the third image processor.

In one or more exemplary methods, the method can further include determining region-of-interest selection control data. The method can include outputting the region-of-interest selection control data. The outputting can be via the output processor. For example, the region-of-interest selection control data may be output to the intermediate image processor. The region-of-interest selection control data may be received by the intermediate image processor. The region-of-interest selection control data may be based on the field-of-view videostream. Thus, the method can include determining and/or selecting a region-of-interest videostream based on the region-of-interest selection control data.

The method can further include receiving user input. The region-of-interest selection control data and/or any of the image control data, e.g. the first image control data, the second image control data, and/or the third image control data can be based on the user input.

The method can further include outputting machine learning output, such as from a machine learning engine. The region-of-interest selection control data and/or any of the image control data, e.g. the first image control data, the second image control data, and/or the third image control data, can be based on the machine learning output.

The various exemplary methods, devices, agents, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Figure 2:
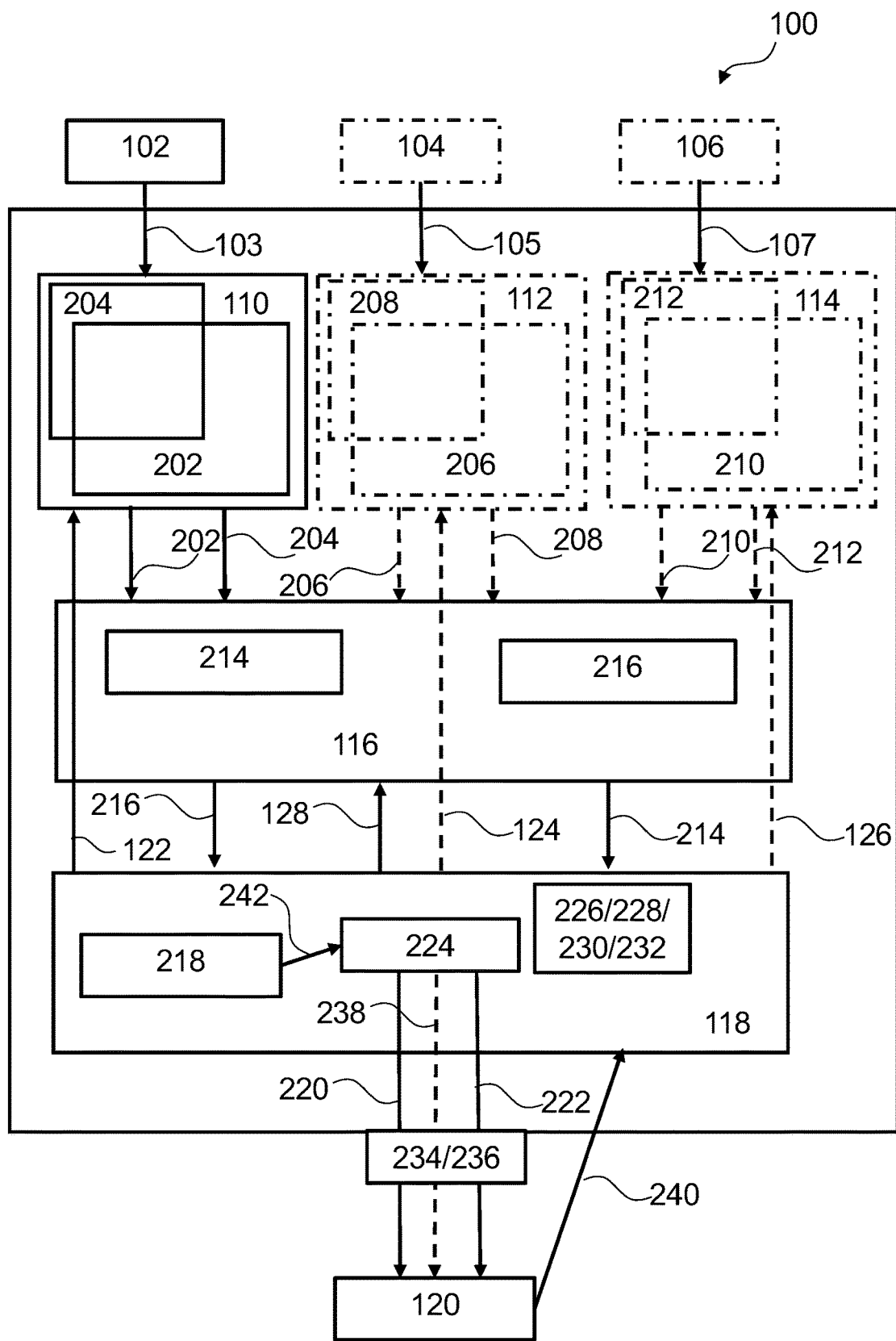
FIG. 2 illustrates a detailed view of an exemplary conference device of the disclosure.

FIG. 1 illustrates an example conference device of the disclosure. FIG. 2 provides a more detailed view of an example conference device.

As shown, the conference device 100 can include a first image sensor 102 for provision of first image data 103. The conference device 100 may optionally have further sensors. The conference device 100 can include a second image sensor 104 for provision of second image data 105. The conference device 100 can include a third image sensor 106 for provision of third image data 107. The following will discuss a videoconference device 100 with three image sensors, though any more than one is optional.

The conference device 100 can further include a first image processor 110 for provision of a first primary videostream 202 and a first secondary videostream 204 based on the first image data 103. The conference device 100 may optionally have further image processor. For example, FIG. 1 shows three image processors each connected to an image sensor. The second image processor 112 can be for provision of a second primary videostream 206 and a second secondary videostream 208 based on the second image data 105. The third image processor 114 can be for provision of a third primary videostream 210 and a third secondary videostream 212 based on the third image data 107. Thus, each of the image processors is in communication with one of the image sensors. There may be a 1:1 relationship between image sensors and image processors.

As shown, the conference device 100 can include an intermediate image processor 116. The intermediate image processor 116 can be in communication with any of the image processors. Thus, the intermediate image processor 116 can be in communication with the first image processor 110, the second image processor 112, and the third image processor 114. The intermediate image processor 116 can be configured for provision of a field-of-view videostream 214 and a region-of-interest videostream 216. The region-of-interest videostream 216 can be based on one or more of the first secondary videostream 202 and the second secondary videostream 204. It can be based on any of the videostreams disclosed.

When using more image sensors, the field-of-view videostream 214 is based on the first primary videostream 202, the second primary videostream 206, and the third primary videostream 210. The region-of-interest videostream 216 is based on one or more of the first secondary videostream 204, the second secondary videostream 208, and the third secondary videostream 212. The field-of-view videostream 214 can be stitched, such as shown in 304 in FIG. 3 which provides illustrates of components in the conference device 100 before the output processor 118, from the first primary videostream 202, the second primary videostream 206, and the third primary videostream 210.

Regarding the region-of-interest videostream 216, the intermediate image processor 116 can be configured to select one of the first secondary videostream 204, the second secondary videostream 208, and the third secondary videostream 212 for the region-of-interest videostream 216. Alternatively, the region-of-interest 216 videostream is combined and/or stitched from the first secondary videostream 204, the second secondary videostream 208, and the third secondary videostream 212 for the region-of-interest videostream 216.

Advantageously, the first primary videostream 202 is independent from the first secondary videostream 204. Accordingly, the first secondary videostream 204 is not a subset of the first primary videostream 202. Advantageously, the second primary videostream 206 is independent from the second secondary videostream 208. Accordingly, the second secondary videostream 208 is not a subset of the second primary videostream 206. Advantageously, the third primary videostream 210 is independent from the third secondary videostream 212. Accordingly, the third secondary videostream 212 is not a subset of the third primary videostream 210.

The conference device 100 can further include an output processor 118 in communication with the intermediate image processor 116. The output processor 118 can be configured to determine first image control data 122, such as based on the field-of-view videostream 214 and transmit the first image control data 122 to the first image processor 110.

Further, the output processor 118 can be configured to determine region-of-interest selection control data 128 and transmit the region-of-interest selection control data 128 to the intermediate image processor 116.

The output processor 118 can provide further image control data if more than one image sensor is utilized. For example, the output processor 118 can be configured to determine second image control data 124 based on the field-of-view videostream 214 and transmit the second image control data 124 to the second image processor 112. The second image processor 112 can be configured for provision of the second secondary videostream 208 based on the second image control data 124. Further, the output processor 118 can be configured to determine third image control data 126 based on the field-of-view videostream 214 and transmit the third image control data 126 to the third image processor 114. The third image processor 114 can be configured for provision of the third secondary videostream 212 based on the third image control data 126.

Accordingly, the first, second, and/or third control data 122/124/126 can be used to properly determine and/or prepare the first, second, and third secondary videostreams 204/208/212.

The output processor 118 can include an output interface 224 configured for provision of a primary output videostream 220 based on the field-of-view videostream 214 and a secondary output videostream 222 based on the region-of-interest videostream 216. The output processor 118 can also be configured to provide a primary output videostream 220 based on the field-of-view videostream 214 and/or the region-of-interest videostream 216. This can be provided to an external device 120, such as a user device.

Further, as shown in FIG. 2, the output processor 118 is configured to perform one or more of image transformation 226, distortion correction 228, enhancement 230, and contrast correction 132 on the region-of-interest videostream 216 to provide the secondary output videostream 222.

Moreover, the conference device 100 can include an interface 234 composed of one or more connectors including a first connector 236. The conference device 100 can be configured for provision of the primary output videostream 220, the secondary output videostream 222, and a metadata 238 output via the first connector 236.

The primary output videostream 220 can have a field of view of at least 120°. The secondary output videostream 222 can have a field of view less than 90°. Of course, other field of views can be used as well.

Further, as shown in FIG. 2 the output processor 118 can include a machine learning engine 218 for provision of a machine learning output 242, and wherein the first image control data 122 and/or the region-of-interest selection control data 128 is at least partially based on the machine learning output 242. The machine learning engine 218 may receive the field-of-view videostream 214 and/or the region-of-interest videostream 216 and be configured to determine the machine-learning output 242 based on the field-of-view videostream 214 and/or the region-of-interest videostream 216. The second image control data 124 and/or the third image control data 126 may be at least partially based on the machine learning output 242. Moreover, the conference device 100 is configured to receive user input 240, and wherein the first image control data 122 and/or the region-of-interest selection control data 128 is at least partially based on the user input 240.

Figure 3:
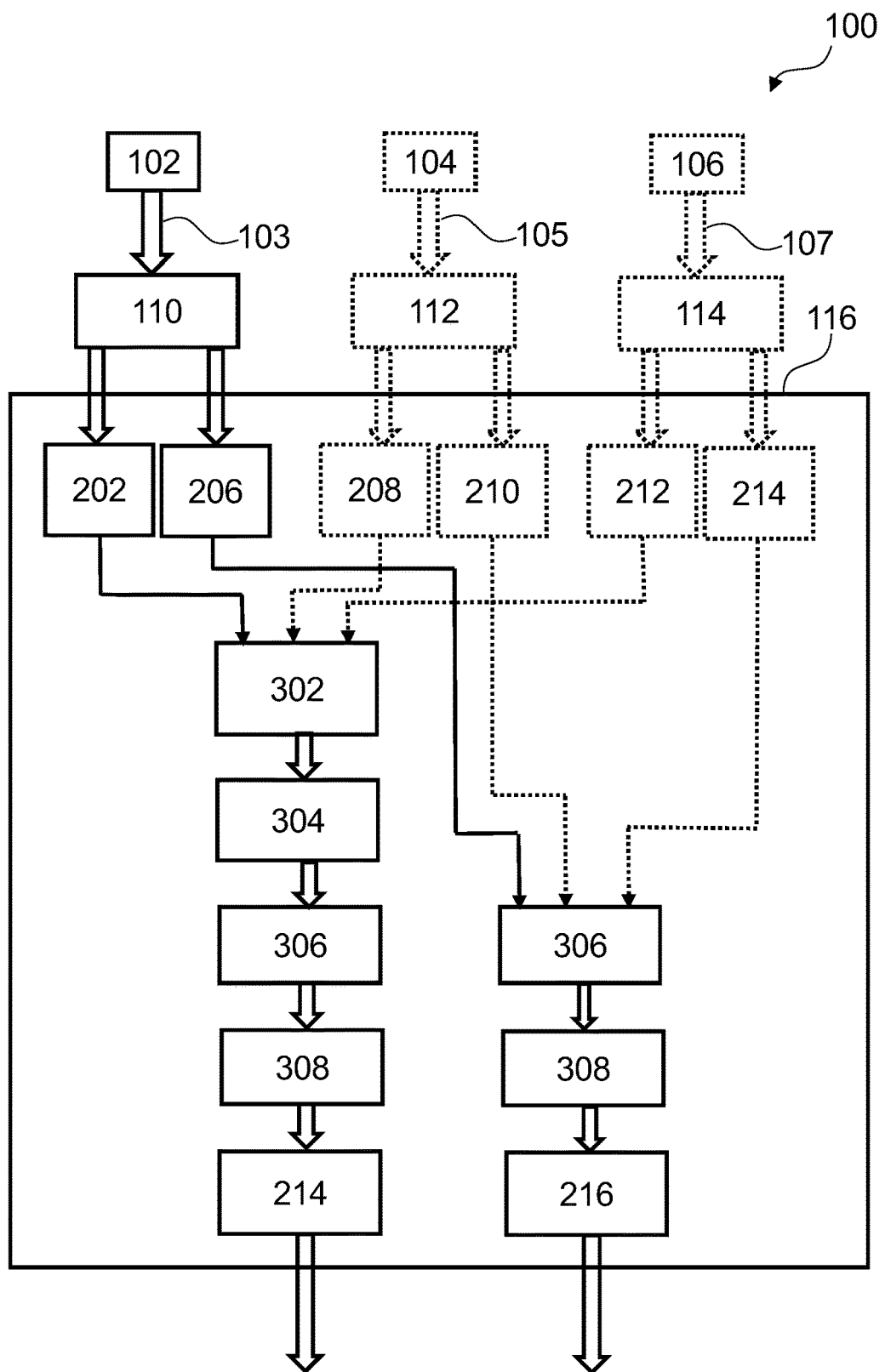
FIG. 3 illustrates a partial view of an exemplary conference device of the disclosure.

FIG. 3 illustrates further details of the intermediate image processor 116. As shown, the intermediate image processor 116 can perform geometric correction 302, video stitching 304, noise reduction 306, and chroma subsampling 308 of the first, second, and third primary videostreams 202/206/210. Further, the intermediate image processor 116 can perform noise reduction 306 and chroma subsampling 308 of the first, second, and third secondary videostreams 204/208/212.

It will be understood that not all connections have not been shown in the above figures, and the disclosure should not be limited to the particular connections shown in the figures above.

Examples of conference devices according to the disclosure are set out in the following items:

Item A1—Conference device comprising:
a first image sensor for provision of first image data;
a second image sensor for provision of second image data;
a first image processor configured for provision of a first primary videostream and a first secondary videostream based on the first image data;
a second image processor configured for provision of a second primary videostream and a second secondary videostream based on the second image data; and
an intermediate image processor in communication with the first image processor and the second image processor and configured for provision of a field-of-view videostream and a region-of-interest videostream, wherein the field-of-view videostream is based on the first primary videostream and the second primary videostream, and wherein the region-of-interest videostream is based on one or more of the first secondary videostream and the second secondary videostream.

Item A2—Conference device according to Item A1, the conference device comprising a third image sensor for provision of third image data, and a third image processor configured for provision of a third primary videostream and a third secondary videostream based on the third image data, wherein the intermediate image processor is in communication with the third image processor, wherein the field-of-view videostream is based on the first primary videostream, the second primary videostream and the third primary videostream, and wherein the region-of-interest videostream is based on one or more of the first secondary videostream, the second secondary videostream, and the third secondary videostream.

Item A3—Conference device according to Item A2, wherein the field-of-view videostream is stitched from the first primary videostream, the second primary videostream, and the third primary videostream.

Item A4—Conference device according to any one of Items A2 and A3, wherein the intermediate image processor is configured to select one of the first secondary videostream, the second secondary videostream, and the third secondary videostream for the region-of-interest videostream.

Item A5—Conference device according to any one of Items A2 and A3, wherein the region-of-interest videostream is stitched from the first secondary videostream, the second secondary videostream, and the third secondary videostream.

Item A6—Conference device according to any of Items A1-A5, wherein the first primary videostream is independent from the first secondary videostream.

Item A7—Conference device according to any of Items A1-A6, the conference device comprising an output processor in communication with the intermediate image processor and configured to determine first image control data based on the field-of-view videostream and transmit the first image control data to the first image processor.

Item A8—Conference device according to Item A7, wherein the output processor is configured to determine region-of-interest selection control data and transmit the region-of-interest selection control data to the intermediate image processor.

Item A9—Conference device according to Item A7 or Item A8, wherein the output processor comprises an output interface configured for provision of a primary output videostream based on the field-of-view videostream and a secondary output videostream based on the region-of-interest videostream.

Item A10—Conference device according Item A9, wherein the output processor is configured to perform one or more of image transformation, distortion correction, enhancement, and contrast correction on the region-of-interest videostream to provide the secondary output videostream.

Item A11—Conference device according to Item A9 or Item A10, wherein the conference device comprises an interface comprising one or more connectors including a first connector, the conference device configured for provision of the primary output videostream, the secondary output videostream, and a metadata output via the first connector.

Item A12—Conference device according to any one of Items A7-A11, wherein the conference device is configured to receive user input, and wherein the first image control data and/or the region-of-interest selection control data is at least partially based on the user input.

Item A13—Conference device according to any one of Items A7-A12, wherein the output processor comprises a machine learning engine for provision of a machine learning output, and wherein the first image control data and/or the region-of-interest selection control data is at least partially based on the machine learning output.

Item A14—Conference device according to any one of Items A1-A12, wherein the first secondary videostream is not a subset of the first primary videostream.

Item B1—Conference device comprising:
 a first image sensor for provision of first image data;
 a first image processor configured for provision of a first primary videostream and a first secondary videostream based on the first image data;
 an intermediate image processor in communication with the first image processor and configured for provision of a field-of-view videostream and a region-of-interest videostream, wherein the field-of-view videostream is based on the first primary videostream, and the region-of-interest videostream is based on the first secondary videostream; and
 an output processor configured to determine first image control data based on the field-of-view videostream and transmit the first image control data to the first image processor;
 wherein the first image processor is configured for provision of the first secondary videostream based on the first image control data.

Item B2—Conference device according to Item B1, wherein the output processor is configured to provide a primary output videostream based on the field-of-view videostream or the region-of-interest videostream.

Item B3—Conference device according to any of Items B1-B2, wherein the output processor is configured to process the region-of-interest videostream for provision of a secondary output videostream, wherein to process the region-of-interest videostream comprises to perform one or more of image transformation, distortion correction, enhancement, and contrast correction.

Item B4—Conference device according to any of Items B1-B3, wherein the conference device comprises a second image sensor for provision of second image data, and a second image processor configured for provision of a second primary videostream and a second secondary videostream based on the second image data, wherein the intermediate image processor is in communication with the second image processor and configured for provision of a field-of-view videostream and a region-of-interest videostream, wherein the field-of-view videostream is based on the first primary videostream and the second primary videostream, and the region-of-interest videostream is based on one or more of the first secondary videostream and the second secondary videostream.

Item B5—Conference device according to any of Items B1-B4, wherein the conference device comprises a third image sensor for provision of third image data, and a third image processor configured for provision of a third primary videostream and a third secondary videostream based on the third image data, wherein the intermediate image processor is in communication with the third image processor and configured for provision of a field-of-view videostream and a region-of-interest videostream, wherein the field-of-view videostream is based on the first primary videostream, the second primary videostream, and the third primary video stream, and the region-of-interest videostream is based on one or more of the first secondary videostream, the second secondary videostream, and the third secondary video stream.

Item B6—Conference device according to Item B5, wherein the intermediate image processor is configured to stitch together the first primary videostream, the second primary videostream, and the third primary video stream for provision of the field-of-view videostream.

Item B7—Conference device according to any one of Items B3-B6, wherein the conference device comprises an interface comprising one or more connectors including a first connector, the conference device configured for provision of the primary output videostream, the secondary output videostream, and a metadata output via the first connector.

Item B8—Conference device according to any one of Items B3-B7, wherein the output processor is configured to determine region-of-interest selection control data and transmit the region-of-interest selection control data to the intermediate image processor.

Item B9—Conference device according to Item B8, wherein the conference device is configured to receive user input, and wherein the first image control data and/or the region-of-interest selection control data is at least partially based on the user input.

Item B10—Conference device according to any one of Items B1-B9, wherein the output processor comprises a machine learning engine for provision of a machine learning output, and wherein the first image control data and/or the region-of-interest selection control data is at least partially based on the machine learning output.

Item B11—Conference device according to any one of Items B4-610, wherein the output processor is configured to determine second image control data based on the field-of-view videostream and transmit the second image control data to the second image processor, wherein the second image processor is configured for provision of the second secondary videostream based on the second image control data.

Item B12—Conference device according to any one of Items B4-B11, wherein the output processor is configured to determine third image control data based on the field-of-view videostream and transmit the third image control data to the third image processor, wherein the third image processor is configured for provision of the third secondary videostream based on the third image control data.

Item B13—Conference device according to any one of Items B3-B12, wherein the primary output videostream has a field of view of at least 120° and the secondary output videostream has a field of view less than 90°.

Item B14—Conference device according to any one of Items B1-B13, wherein the first secondary videostream is not a subset of the first primary videostream.

Item B15—Conference device according to any one of Items B1-B14, wherein the first primary videostream is independent of the first secondary videostream.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-3 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in the order presented. Furthermore, it should be appreciated that not all of the operations need to be performed. The exemplary operations may be performed in any order and in any combination. It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 100 conference device
102 first image sensor
103 first image data
104 second image sensor
105 second image data
106 third image sensor
107 third image data
110 first image processor
112 second image processor
114 third image processor
116 intermediate image processor
118 output processor
120 external device
122 first image control data
124 second image control data
126 third image control data
128 region-of-interest selection control data
202 first primary videostream
204 first secondary videostream
206 second primary videostream
208 second secondary videostream
210 third primary videostream 212 third secondary videostream
214 field-of-view videostream
216 region-of-interest videostream
218 machine learning engine
220 primary output videostream
222 secondary output videostream
224 output interface
226 image transformation
228 distortion correction
230 enhancement
232 contrast correction
234 interface
236 first connector
238 metadata
240 user input
242 machine learning output
302 geometric correction
304 video stitch
306 noise reduction
308 chroma subsampler

The invention claimed is:

1. A conference device comprising:
a first image sensor for provision of first image data;
a first image processor configured for provision of a first primary videostream and a first secondary videostream based on the first image data;
an intermediate image processor in communication with the first image processor and configured for provision of a field-of-view videostream and a region-of-interest videostream, wherein the field-of-view videostream is based on the first primary videostream, and the region-of-interest videostream is based on the first secondary videostream; and
an output processor configured to determine first image control data based on the field-of-view videostream and transmit the first image control data to the first image processor;
wherein the first image processor is configured for provision of the first secondary videostream based on the first image control data.

2. The conference device according to claim 1, wherein the output processor is configured to provide a primary output videostream based on the field-of-view videostream or the region-of-interest videostream.

3. The conference device according to claim 2, wherein the output processor is configured to process the region-of-interest videostream for provision of a secondary output videostream, wherein to process the region-of-interest videostream comprises to perform one or more of image transformation, distortion correction, enhancement, and contrast correction.

4. The conference device according to claim 3, wherein the conference device comprises a second image sensor for provision of second image data, and a second image processor configured for provision of a second primary videostream and a second secondary videostream based on the second image data, wherein the intermediate image processor is in communication with the second image processor and configured for provision of a field-of-view videostream and a region-of-interest videostream, wherein the field-of-view videostream is based on the first primary videostream and the second primary videostream, and the region-of-interest videostream is based on one or more of the first secondary videostream and the second secondary videostream.

5. The conference device according to claim 4, wherein the conference device comprises a third image sensor for provision of third image data, and a third image processor configured for provision of a third primary videostream and a third secondary videostream based on the third image data, wherein the intermediate image processor is in communication with the third image processor and configured for provision of a field-of-view videostream and a region-of-interest videostream, wherein the field-of-view videostream is based on the first primary videostream, the second primary videostream, and the third primary video stream, and the region-of-interest videostream is based on one or more of the first secondary videostream, the second secondary videostream, and the third secondary video stream.

6. The conference device according to claim 5, wherein the intermediate image processor is configured to stitch together the first primary videostream, the second primary videostream, and the third primary video stream for provision of the field-of-view videostream.

7. The conference device according to claim 6, wherein the conference device comprises an interface comprising one or more connectors including a first connector, the conference device configured for provision of the primary output videostream, the secondary output videostream, and a metadata output via the first connector.

8. The conference device according to claim 7, wherein the output processor is configured to determine region-of-interest selection control data and transmit the region-of-interest selection control data to the intermediate image processor.

9. The conference device according to claim 8, wherein the conference device is configured to receive user input, and wherein the first image control data and/or the region-of-interest selection control data is at least partially based on the user input.

10. The conference device according to claim 9, wherein the output processor comprises a machine learning engine for provision of a machine learning output, and wherein the first image control data and/or the region-of-interest selection control data is at least partially based on the machine learning output.

11. The conference device according to claim 10, wherein the output processor is configured to determine second image control data based on the field-of-view videostream and transmit the second image control data to the second image processor, wherein the second image processor is configured for provision of the second secondary videostream based on the second image control data.

12. The conference device according to claim 11, wherein the output processor is configured to determine third image control data based on the field-of-view videostream and transmit the third image control data to the third image processor, wherein the third image processor is configured for provision of the third secondary videostream based on the third image control data.

13. The conference device according to claim 12, wherein the primary output videostream has a field of view of at least 120° and the secondary output videostream has a field of view less than 90°.

14. The conference device according to claim 13, wherein the first secondary videostream is not a subset of the first primary videostream.

15. The conference device according to claim 14, wherein the first primary videostream is independent of the first secondary videostream.

* * * * *